United States Patent
Rawding et al.

(10) Patent No.: US 12,263,787 B2
(45) Date of Patent: Apr. 1, 2025

(54) EXTERIOR REAR VIEW MIRROR ASSEMBLY FOR ROAD VEHICLES, EXTERIOR REAR VIEW MIRROR ASSEMBLY SYSTEM FOR LEFT HAND DRIVE AND RIGHT HAND DRIVE ROAD VEHICLES AND METHOD OF MANUFACTURING

(71) Applicant: MOTHERSON INNOVATIONS COMPANY LIMITED, London (GB)

(72) Inventors: Steve Rawding, Hampshire (GB); Chris Boyd, Hampshire (GB); Ryan Gomes, Hampshire (GB)

(73) Assignee: MOTHERSON INNOVATIONS COMPANY LIMITED., London (GB)

( * ) Notice: Subject to any disclaimer, the term of this patent is extended or adjusted under 35 U.S.C. 154(b) by 141 days.

(21) Appl. No.: 17/705,650

(22) Filed: Mar. 28, 2022

(65) Prior Publication Data
US 2022/0314883 A1 Oct. 6, 2022

(30) Foreign Application Priority Data
Mar. 31, 2021 (DE) .......................... 102021203317.2

(51) Int. Cl.
*B60R 1/072* (2006.01)
*B60R 1/06* (2006.01)

(52) U.S. Cl.
CPC ................ *B60R 1/072* (2013.01); *B60R 1/06* (2013.01)

(58) Field of Classification Search
CPC .. B60R 1/06; B60R 1/072; B60R 1/02; B60R 2011/004
(Continued)

(56) References Cited

U.S. PATENT DOCUMENTS 4,394,066 A * 7/1983 Sharp ........................ B60R 1/06
359/872
4,867,408 A * 9/1989 Ozaki .................. G11B 7/2472
248/483

(Continued)

FOREIGN PATENT DOCUMENTS

CN 1618659 A 5/2005
CN 1948051 A 4/2007
(Continued)

OTHER PUBLICATIONS

"Extending," Oxford Languages, Jan. 19, 2024 (Year: 2024).*
(Continued)

*Primary Examiner* — Ricky D Shafer
(74) *Attorney, Agent, or Firm* — Westman, Champlin & Koehler, P.A.

(57) ABSTRACT

An exterior rear view mirror assembly for road vehicles includes a frame structure configured to be attached to a vehicle body, a case bezel for casing a rear mirror glass and attaching to the frame structure, and a motor adaptor to couple the frame structure with a mirror actuator. The motor adaptor includes a first form-coding element and the case bezel includes a second form-coding element, which are formed and arranged such that they engage with each other when the case bezel and the motor adaptor are attached to the frame structure such that the case bezel and the motor adaptor cannot be assembled if the first and second form-coding elements do not correspond. The configuration provides a corresponding assembly system for left and right hand drive road vehicles and a method of manufacturing.

13 Claims, 7 Drawing Sheets

(58) Field of Classification Search
USPC .......................................... 359/844, 841, 877
See application file for complete search history.

(56) References Cited

U.S. PATENT DOCUMENTS

| | | | | |
|---|---|---|---|---|
| 5,726,816 | A * | 3/1998 | Gordon | B60R 1/06 359/872 |
| 5,844,733 | A | 12/1998 | Ravanini | |
| 6,347,872 | B1 * | 2/2002 | Brechbill | B60R 1/06 359/838 |
| 6,447,129 | B2 * | 9/2002 | Hayashi | B60R 1/074 359/872 |
| 6,550,923 | B2 * | 4/2003 | Sakamoto | B60R 1/072 359/872 |
| 7,033,033 | B2 * | 4/2006 | Ishigami | B60R 1/06 359/872 |
| 7,048,393 | B2 * | 5/2006 | Sugiyama | B60R 1/06 359/872 |
| 7,134,760 | B2 * | 11/2006 | Koerner | B60R 1/06 359/881 |
| 7,198,378 | B2 | 4/2007 | Lang et al. | |
| 7,488,081 | B2 | 2/2009 | Yoshida et al. | |
| 8,858,002 | B2 | 10/2014 | Suzuki | |
| 9,156,404 | B2 * | 10/2015 | Heger | G02B 7/182 |
| 9,950,670 | B2 | 4/2018 | Viciosa | |
| 10,046,704 | B2 | 8/2018 | Vicioso et al. | |
| 2001/0007515 | A1 | 7/2001 | Inagaki et al. | |
| 2005/0122605 | A1 | 6/2005 | Lang et al. | |
| 2006/0274443 | A1 | 12/2006 | Lang et al. | |
| 2007/0092368 | A1 | 4/2007 | Yoshida et al. | |
| 2013/0070358 | A1 | 3/2013 | Suzuki | |
| 2017/0120825 | A1 | 5/2017 | Viciosa | |
| 2017/0203695 | A1 | 7/2017 | Vicioso et al. | |

FOREIGN PATENT DOCUMENTS

| | | | |
|---|---|---|---|
| CN | 102233853 A | 11/2011 | |
| CN | 106458099 A | 2/2017 | |
| CN | 106985752 A | 7/2017 | |
| DE | 20312173 U1 | 12/2004 | |
| DE | 102005025614 A1 | 12/2006 | |
| DE | 102012016156 A1 | 3/2013 | |
| EP | 1531084 A2 * | 5/2005 | .......... B60R 1/0605 |
| EP | 2233360 B1 | 7/2011 | |
| JP | H08113084 A | 5/1996 | |
| JP | 2004299584 A | 10/2004 | |

OTHER PUBLICATIONS

First Office Action, including Search Report, for Chinese Patent Application No. 202210333888.5, dated Nov. 30, 2022, 24 pages.
Office Action for German Patent Application No. 10 2021 203 317.2, dated Sep. 20, 2021, 4 pages.

* cited by examiner

EXTERIOR REAR VIEW MIRROR ASSEMBLY FOR ROAD VEHICLES, EXTERIOR REAR VIEW MIRROR ASSEMBLY SYSTEM FOR LEFT HAND DRIVE AND RIGHT HAND DRIVE ROAD VEHICLES AND METHOD OF MANUFACTURING

CROSS-REFERENCE TO RELATED APPLICATION

This application claims priority to German Patent Application No. 102021203317.2, filed on Mar. 31, 2021, the content of which is hereby incorporated by reference in its entirety.

FIELD OF THE INVENTION

The present invention relates to an exterior rear view mirror assembly for road vehicles. The present invention also relates to an exterior rear view mirror assembly system for left hand drive and right hand drive road vehicles and to a method of manufacturing an exterior rear view mirror assembly for left hand drive and right hand drive road vehicles.

BACKGROUND OF THE INVENTION

Road vehicles usually have a left and a right exterior rear view mirror.

EP 2 233 360 B1 describes an external rear view mirror assembly comprising a connection means that fits mirror components as a support frame mounted to a mirror housing or shell and provides a snap-fit connection to ease assembly of a rear view mirror.

However, road vehicles are usually manufactured in varying configurations for countries with right-hand traffic and countries with left-hand traffic, respectively, especially in terms of different driver's positions. Thus, usually four different variants of exterior rear view mirror assemblies need to be manufactured for different configurations of left hand drive and right hand drive road vehicles.

Furthermore, rear view mirrors are often "just in time" (JIT) delivery products, which means each version of a rear mirror assembly being manufactured needs to comply with specific requirements, such as left or right hand drive, colour, sensor and/or size configurations.

Accordingly, it is necessary to provide a large number of varying parts for the different configurations. The assembly process is therefore prone to unintentional mixing of parts of different configurations, in particular with respect to only slightly differing parts of the left hand drive or the right hand drive configurations. Mixing up parts of different configurations may lead to increased manufacturing time, necessity of rework of the assembly or even damage of the parts. Furthermore, comparably high complexity leads to a reduced efficiency in manufacturing.

SUMMARY OF THE INVENTION

In view of the above, there is a need to provide a new and improved assembly, assembly system and method of manufacturing for exterior rear view mirrors thereby reducing the complexity of manufacturing.

Accordingly, the present invention provides an exterior rear view mirror assembly for road vehicles as recited in claim 1, an exterior rear view mirror assembly system for left hand drive and right hand drive road vehicles as recited in claim 6, and a method of manufacturing an exterior rear view mirror assembly for left hand drive and right hand drive road vehicles as recited in claim 12 are provided. Advantageous or preferred features of the invention are recited in the dependent claims.

According to one aspect, the present invention therefore provides an exterior rear view mirror assembly for road vehicles. The assembly comprises a frame structure configured to be attached to a vehicle body, a case bezel for casing a rear mirror reflective element, in particular a rear mirror glass or other reflective surface, and configured to be attached to the frame structure, and a motor adaptor configured to couple the frame structure with a mirror actuator. The motor adaptor comprises a first form-coding element and the case bezel comprises a second form-coding element. The first and second form-coding elements are formed and arranged such that they correspond to and engage with each other when the case bezel and the motor adaptor are attached to the frame structure. Furthermore, the first and second form-coding elements are formed and arranged such that the case bezel and the motor adaptor cannot be assembled if the first and second form-coding elements do not correspond.

In this way, the invention allows to easily distinguish left hand drive and right hand drive configurations of the case bezel and the motor adaptor by means of the form-coding elements. Different case bezel configurations are required for a left hand drive and a right hand drive orientation, respectively, and the motor adaptor is configured to set the mirror actuator in either a left hand drive or a right hand drive position. The form-coding elements only fit together in matching configurations of both parts. Accordingly, mixing-up of parts in a manufacturing or repair process is effectively avoided.

Furthermore, the use of a motor adaptor to couple the frame structure with a mirror actuator such that the mirror actuator is positioned in front of the frame structure when assembled allows for different orientations of the mirror actuator for different configurations. Thus, advantageously, a similar frame structure, in particular a similar case frame, can be used for both, a left hand drive configuration and a right hand drive configuration of the assembly. According to the invention, it is possible to reduce the number of the variants required of at least some parts of the assembly, in particular a reduction from previously four versions required to only two versions is possible according to the invention.

According to another aspect, the first form-coding element is formed integral with a sliding element configured to contact a mirror vibration damper. In particular, a position and/or a form of the sliding element differ for a left hand drive configuration and a right hand drive configuration of the motor adaptor. Accordingly, the first form-coding element and the sliding element together form one portion of the motor adaptor thereby achieving an integration of different functions of damping and form-coding in this portion. In particular, a mirror vibration damper can be formed as a thin piece of metal and fits onto the back of a backplate of a reflective element, such as a mirror glass, and the other end of the damper contacts with the sliding element on the motor adaptor.

According to another aspect, the first form-coding element is formed as a ramp extending from the motor adaptor. In particular, the ramp forms the sliding element and is configured to contact the mirror vibration damper. The ramp is preferably configured to be curved and physically connect the mirror vibration damper on a backplate of the mirror reflective element. This connection allows the ramp to reduce vibrations occurring on the mirror glass when the road vehicle is in operation. The position of the ramp on the motor adaptor is different for a left hand drive configuration and a right hand drive configuration of the motor adaptor, respectively. However, in other embodiment where no mirror vibration damper is needed, the ramp may serve as first form coding element only.

According to another aspect, the ramp is formed in a cored-out fashion in order to comprise a recess. The cored-out form can be achieved by for example inserting an additional change insert in the forming tool for the motor adaptor, e. g. for injection moulding. In particular, a spring provided in the forming tool can open the insert to form the recess. Alternatively, the recess may be created by machining. In this way, if no or only a reduced damping function is required, the ramp is still provided as form-coding element in an efficient material and weight saving way.

According to another aspect, the second form-coding element is provided as a recess in the case bezel which is formed to accommodate a section of the ramp. The position of the recess is different in a left hand drive configuration and a right hand drive configuration of the case bezel, respectively. Accordingly, there is only one possibility to insert a ramp of a right hand drive configuration of the motor adaptor in a recess of a right hand drive configuration of the case bezel, and there is only one possibility to insert a ramp of a left hand drive configuration of the motor adaptor in the recess of a left hand drive configuration of the case bezel.

According to a further aspect, the present invention provides an exterior rear view mirror assembly system for left hand drive and right hand drive road vehicles. The assembly system comprises a rear mirror assembly according to the invention, wherein the frame structure is configured to be attached equally to a vehicle body of a left hand drive and a right hand drive road vehicle, respectively. Furthermore, the case bezel has a different configuration for a left hand drive and a right hand drive road vehicle, respectively, wherein the second form-coding element is form-coded in a first configuration for a left hand drive vehicle and in a second configuration for a right hand drive vehicle, respectively. The motor adaptor and the case bezel can be attached to the frame structure only if the first form-coding element corresponds to the respective configuration of the case bezel such that the first and second form-coding elements engage with each other.

In this way, mixing-up parts of different configurations in a manufacturing or repair process is effectively avoided, since the parts can be mounted with each other only if the motor adaptor is either formed or positioned such that the first and second form-coding elements match to each other.

Furthermore, the motor adaptor which couples the frame structure with a mirror actuator allows for different orientations of the mirror actuator for different configurations. In this way, a similar frame structure, in particular case frame, can be used for both, a left hand drive configuration and a right hand drive configuration of the assembly, respectively.

According to another aspect, the motor adaptor has a different configuration for a left hand drive and a right hand drive road vehicle, respectively. Accordingly, the first form-coding element is form-coded in a first configuration for a left hand drive vehicle and in a second configuration for a right hand drive vehicle, respectively. The first configurations of the first and second form-coding elements correspond to each other, and the second configurations of the first and second form-coding elements correspond to each other. In this way, the form-coding necessitates mating first or second configuration parts for assembly thereby preventing mixing up first and second configuration parts.

According to another aspect, the motor adaptor is configured equally for a left hand drive and a right hand drive road vehicle, respectively. Therefore, the motor adaptor comprises a first set of attachment elements and a second set of attachment elements wherein the frame structure comprises corresponding attachment points for both of the first and second sets of attachment elements. The motor adaptor is attachable to the frame structure with the first set of attachment elements such that the first form-coding element corresponds to the first configuration of the second form-coding element. Furthermore, the motor adaptor is attachable to the frame structure with the second set of attachment elements, such that the first form-coding element corresponds to the second configuration of the second form-coding element. In this way, the same adaptor can be used for both configurations. Depending on the configuration, the adaptor is simply mounted to the frame structure in a different way using either the first or the second set of attachment elements thereby matching to the respective configuration of the case bezel and the second form-coding element thereof. Accordingly, the number of different parts of the assembly system for left hand drive and right hand drive road vehicles and the complexity of the manufacturing process is reduced.

According to another aspect, attachment of the motor adaptor to the frame structure is achieved with the first set of attachment elements in a first position relative to the frame structure for a left hand drive vehicle, and with the second set of attachment elements in a second position relative to the frame structure for a right hand drive vehicle, respectively.

According to another aspect, the motor adaptor is partially attached to and structurally supported by the case bezel in at least one of the first and second positions. Therefore, at least one configuration, e. g. the first configuration of the case bezel provides a support section for the motor adaptor at a first location, and the first configuration of the second form-coding element only fits with the first form-coding element if the motor adaptor is mounted to the frame structure with the first set of attachment elements.

According to another aspect, the second configuration of the case bezel also provides a support section for the motor adaptor at a second location wherein the second configuration of the second form-coding element only fits with the first form-coding element if the motor adaptor is mounted to the frame structure with the second set of attachment elements.

According to another aspect, the motor adaptor may be further supported in a central section thereof by means of a pivot spine in both configurations. In this way the same motor adaptor can be used for both configurations and is securely supported in the respective first or second position. Furthermore, it is impossible to misassemble the motor adaptor.

According to another aspect, the assembly system is further configured for different sizes of the case bezel, wherein the frame structure comprises at least two sets of attachment points arranged in different heights such that attachment of the motor adaptor is achieved in a first height in the centre of a case bezel of a first size, and in a second height in the centre of a case bezel of a second size. In this way, it is an advantage that similar motor adaptors and similar frame structures can be used for different rear mirror sizes with differently sized case bezels.

According to another aspect, the invention provides a method of manufacturing an exterior rear view mirror assembly for left hand drive and right hand drive road vehicles, in particular an external rear view mirror assembly according to the invention and/or with an assembly system according to the invention, comprising the following steps:

providing a frame structure configured to be equally attached to a vehicle body of a left hand drive and a right hand drive road vehicle, respectively;

providing a motor adaptor configured to couple the frame structure with a mirror actuator, wherein the motor adaptor comprises a first form-coding element;

providing a case bezel for casing a rear mirror glass and configured to be attached to the frame structure, wherein the case bezel has a different configuration for a left hand drive and a right hand drive road vehicle, respectively, and comprises a second form-coding element which is form-coded in a first configuration for a left hand drive vehicle or in a second configuration for a right hand drive vehicle; and attaching the case bezel and the motor adaptor to the frame structure such that the first form-coding element corresponds to the respective configuration of the case bezel and engages with the second form-coding element.

As discussed above, the invention is configured in order to prevent mixing-up of parts in a manufacturing or repair process, since the parts can only be mounted with each other if a motor adaptor is formed and/or positioned such that the first and second form-coding elements match with each other. Furthermore, the number of varying parts is reduced by using the motor adaptor to couple the frame structure with a mirror actuator in different orientations of the mirror actuator such that the same frame structure, in particular case frame, can be used for both, a left hand drive configuration and a right hand drive configuration of the assembly.

According to another aspect of the method, the motor adaptor also has a different configuration for a left hand drive and a right hand drive road vehicle, respectively, wherein the first form-coding element is form-coded in a first configuration for a left hand drive vehicle and in a second configuration for a right hand drive vehicle, respectively. The first configurations of the first and second form-coding elements correspond to each other and the second configurations of the first and second form-coding elements correspond to each other. The corresponding configurations of case bezel and the motor adaptor are attached to the frame structure such that the first form-coding element engages with the second form-coding element. In this way, the form-coding only allows combinations of mating first or second configuration parts and prevents mixing of first and second configuration parts.

According to another aspect of the method, the motor adaptor is attached to the frame structure before the case bezel is attached to the frame structure. Attaching the case bezel to the frame structure engages the first and second form-coding elements with each other such that the case bezel surrounds the motor adaptor. Accordingly, the case bezel must be attached to the combined frame structure and motor adaptor in such a way that the second form-coding element engages with the first form-coding element. Furthermore, attachment elements of the case bezel structurally connect to attachment points of the frame structure. In this way, only a corresponding configuration of the case bezel that matches with the motor adaptor in the previously mounted position can be mounted to the combined frame structure and motor adaptor.

According to another aspect of the method, the motor adaptor comprises a first set of attachment elements and a second set of attachment elements. The frame structure comprises corresponding attachment points for both of the first and second sets of attachment elements. The motor adaptor is attached to the frame structure with the first set of attachment elements in a first position relative to the frame structure such that the first form-coding element corresponds to the first configuration of the second form-coding element for a left hand drive vehicle. Alternatively, the motor adaptor is attached to the frame structure with the second set of attachment elements in a second position relative to the frame structure such that the first form-coding element corresponds to the second configuration of the second form-coding element for a right hand drive vehicle. In this way, the same adaptor is used for both, the first or the second configurations of the case bezel and respectively mounted in a different way using either the first or second sets of attachment elements. Accordingly, the number of different parts needed and the complexity of the manufacturing process is reduced. For example, a JIT manufacturing and delivery for left hand drive vehicles and right hand drive vehicles is possible with a reduced variety of parts.

According to another aspect of the method, the case bezel is attached to the frame structure before the motor adaptor, wherein the motor adaptor is attached to the frame structure such that it overlaps at least partially the case bezel and is structurally supported by the case bezel. Therefore, at least one configuration, e. g. the first configuration of the case bezel is used to provide a support section for the motor adaptor at a first location. In this way, it can be ensured that the first configuration of the second form-coding element fits with the first form-coding element if the motor adaptor is mounted with the first set of attachment elements to the frame structure.

Furthermore, in another aspect, also the second configuration of the case bezel is used to provide a support section for the motor adaptor at a second location, wherein the second configuration of the second form-coding element fits with the first form-coding element if the motor adaptor is mounted with the second set of attachment elements to the frame structure. In this way, misassembly of the motor adaptor is avoided for both configurations of the case bezel, and the same motor adaptor can be used for both configurations.

The above aspects can be combined with each other as desired, if useful. Further possible aspects, further configurations and implementations of the invention also include combinations, not explicitly mentioned, of features of the invention described herein with respect to the embodiments. In particular, the skilled person will thereby also add individual aspects as improvements or additions to the respective basic form of the present invention.

BRIEF DESCRIPTION OF THE DRAWINGS

For a more comprehensive understanding of the invention and the advantages thereof, exemplary embodiments of the invention are explained in more detail in the following description with reference to the accompanying drawing figures, in which like reference characters designate like parts and in which.

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the resulting advantages of the invention will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not actually required. It will also be understood that the terms and expressions used in the present specification have the ordinary meaning as is accorded to such terms and expressions with respect to their corresponding respective areas of inquiry and study, except where specific meanings have otherwise been set forth herein.

DETAILED DESCRIPTION OF EMBODIMENTS

Figure 1:
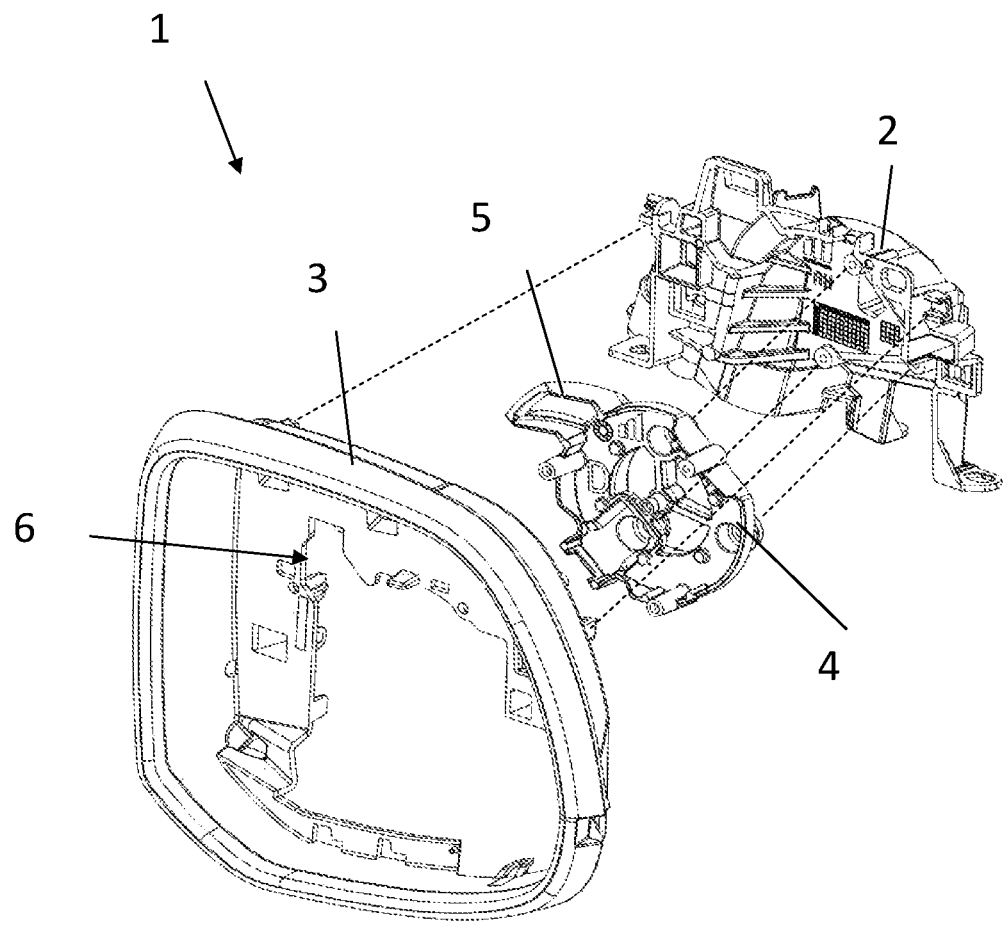
FIG. 1 is an exploded view of an exterior rear view mirror assembly for road vehicles.

FIG. 1 schematically illustrates an exploded view of an exterior rear view mirror assembly 1 for road vehicles.

The assembly 1 includes a frame structure 2 configured to be attached to a vehicle body. Furthermore, the assembly includes a case bezel 3 for casing a rear mirror reflective element, such as a mirror glass or other reflective surface, and configured to be attached to the frame structure 2. In addition, the assembly includes a motor adaptor 4 configured to couple the frame structure 2 with a mirror actuator (not shown in FIG. 1) for adjusting the rear mirror reflective element.

The motor adaptor 4 and the case bezel 3 both comprise form-coding elements. The motor adaptor 4 comprises a first form-coding element 5 and the case bezel 3 comprises a second form-coding element 6. The first and second form-coding elements 5, 6 are formed and arranged to correspond to and engage with each other when the case bezel 3 and the motor adaptor 4 are attached to the frame structure 2. This means, the form-coding elements allow the assembly and engagement of attachment elements of the case bezel 3 and the motor adaptor 4 with attachment points of the frame structure 2, as schematically indicated by the dashed lines in FIG. 1.

Furthermore, the first and second form-coding elements 5, 6 are formed and arranged such that the case bezel 3 and the motor adaptor 4 cannot be assembled if the first and second form-coding 5, 6 elements do not correspond. In this way, the invention provides an assembly which allows to easily distinguish left hand drive and right hand drive configurations of the case bezel 3 and the motor adaptor 4 by means of the form-coding elements 5, 6. Different case bezels 3 are needed for left hand drive or right hand drive orientation, and the motor adaptor 4 is configured to set a mirror actuator (not shown) in either a left hand drive or a right hand drive position. The form-coding elements 5, 6 only fit together in matching configurations of both parts. Thus, the mounting of the assembly 1 is only possible if the parts correspond to each other, in the manner of a poke yoke.

Accordingly, mixing-up parts in a manufacturing or repair process is effectively prevented. Furthermore, the use of a motor adaptor 4 to couple the frame structure 2 with a mirror actuator such that the mirror actuator is positioned in front of the frame structure 2 when assembled allows adaption of orientation of the mirror actuator. Therefore, a similar frame structure 2, in particular configured as a case frame, can be used for both, a left hand drive configuration and a right hand drive configuration of the assembly 1. As a result, a reduction of the number of part variants and of the complexity of manufacturing is achieved.

Figure 2:
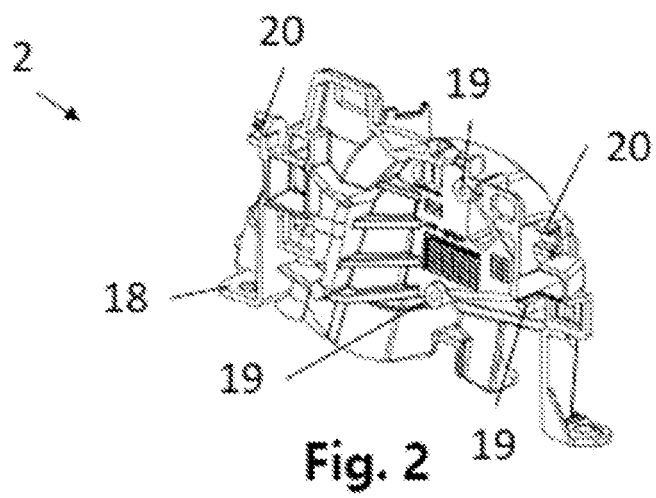
FIG. 2 is a perspective view of a frame structure.

With reference to FIG. 2, a single perspective view of the frame structure 2 is shown.

In order to be attached to a vehicle body (not shown), the frame structure 2 comprises an attachment section 18, in the present embodiment configured to be attached to a bolt or axis. Furthermore, in order to mount the motor adaptor 4 to the frame structure 2, the frame structure 2 comprises a plurality of, in the present example three, attachment points 19 matching with attachment elements 22 of the motor adaptor 4. For example, the attachment points 19 are configured as blind holes in which fasteners, such as screws, fixing the motor adaptor 4 to the frame structure 2 can be fixed.

Furthermore, the frame structure 2 comprises a plurality of attachment points 20 matching with attachment elements 21 of the case bezel 3.

Figure 3:
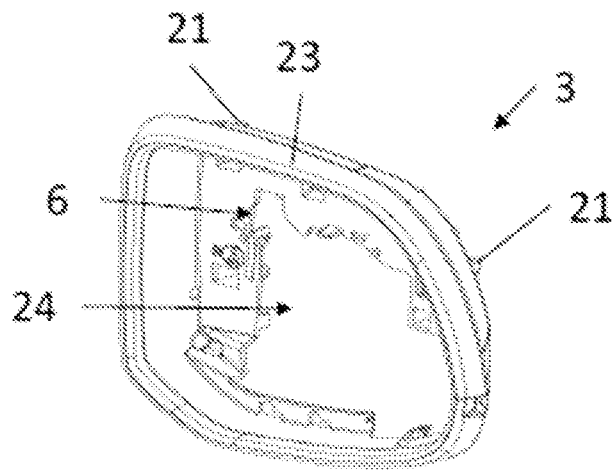
FIG. 3 is a perspective view of a case bezel.

With reference to FIG. 3, a single perspective view of the case bezel 3 is shown.

The case bezel comprises a frame 23 for enclosing a rear mirror glass (not shown) to be cased in the case bezel 3. The case bezel 3 further has a central aperture 24 configured to accommodate the motor adaptor 4 and a mirror actuator. In the example shown, the second form-coding element is a recess in the case bezel 3 which is arranged at the edge of the aperture 24 and is formed to accommodate the first form-coding element.

Furthermore, in order to mount the case bezel 3 to the frame structure 2, the case bezel 3 comprises a plurality of, in the present example two, attachment elements 21 matching with attachment points 20 of the motor adaptor 4. For example, the attachment elements 21 are configured as clips, and the attachment points 20 are configured as receptacles in which the clips can be received.

Figures 4, 5:
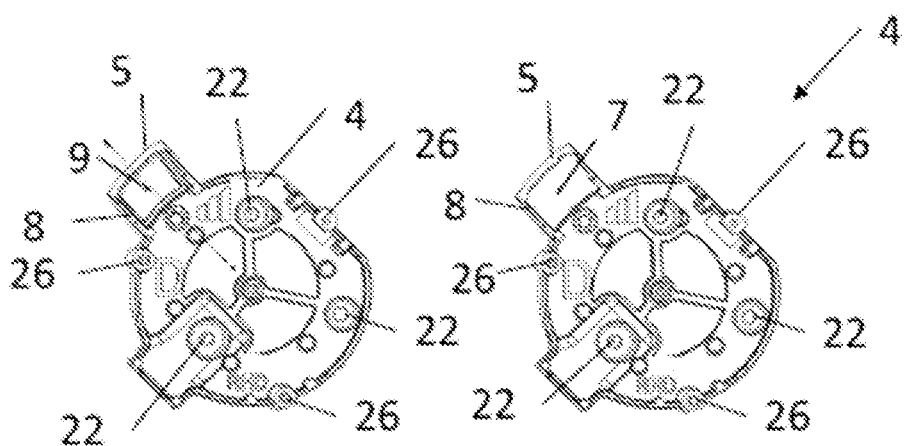
FIG. 4 is a detailed front view of a motor adaptor.
FIG. 5 is a detailed front view of a motor adaptor according to another embodiment.

With reference to FIG. 4, a detailed front view of a motor adaptor 4 is shown.

A motor adaptor 4 is configured to set the mirror actuator in either a left hand drive or a right hand drive position. Therefore, it can be fixed to the structural frame 2 by means of attachment elements 22, in the example shown formed as three screw mounts. Additional attachment points 26 are provided to fix the mirror actuator on the outer circumference of the motor adaptor 4.

The first form-coding element 5 extends from the outer circumference of the motor adaptor 4 such that it can engage in a mounted state with the second form-coding element 6 formed as a recess and arranged at the edge of the aperture 24 in the case bezel 3.

In this exemplary embodiment, the first form-coding element 5 is formed integral with a sliding element 7 configured to contact a mirror vibration damper. Therefore, the first form-coding element 5 is formed as a ramp 8 extending from the outer circumference of the motor adaptor 4 in a curved form around the mirror actuator in order to contact the mirror damper on a backplate of a mirror reflective element actuated by the actuator.

FIG. 5 is a detailed front view of a motor adaptor 4 according to another embodiment.

This embodiment differs from the embodiment of FIG. 4 in that the ramp 8 is formed in a cored-out fashion such that it comprises a recess 9. For example, the recess 9 can be formed during the forming process of the motor adaptor by inserting an additional change insert in the forming tool. In particular, a spring provided in the forming tool can open the insert to form the recess. This variant can be used if no or only reduced damping function for the mirror glass is required. Accordingly, the ramp 8 maintains the form-coding functionality in the manner of a poke yoke similar to the embodiment of FIG. 4, however, weight is reduced and material is saved.

Figure 6:
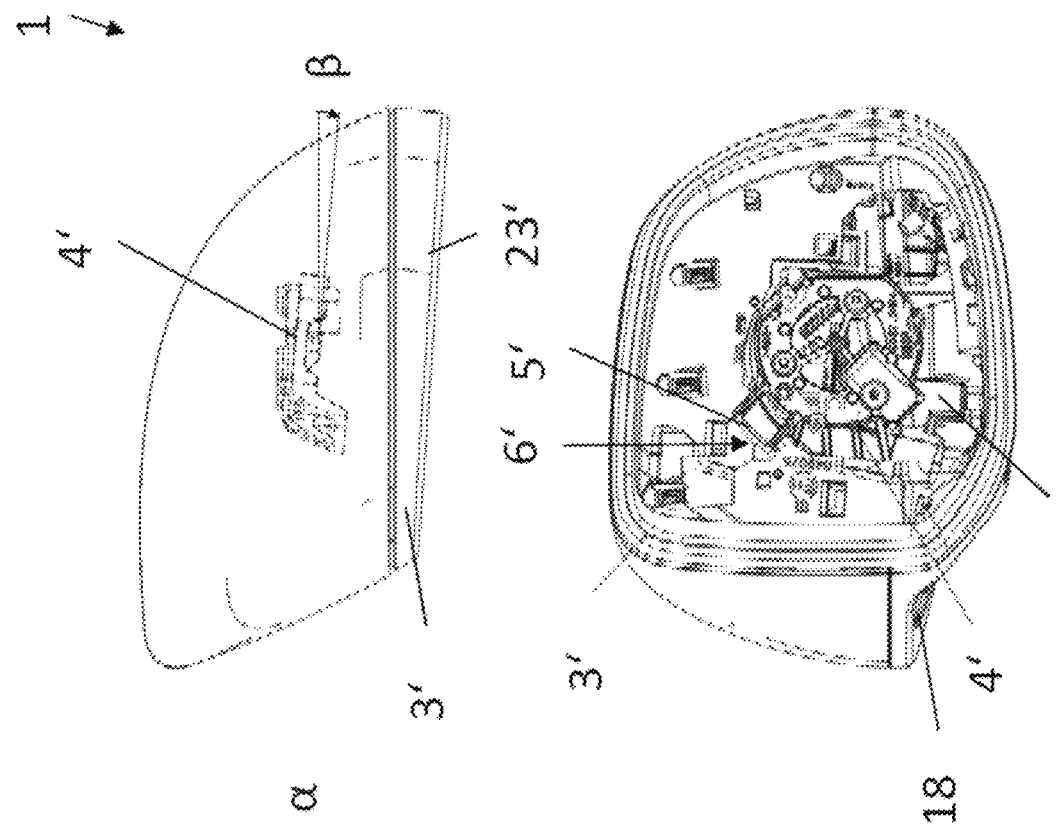
FIG. 6 is a top view and front view of a driver exterior rear view mirror assembly in an assembled state for a right hand drive road vehicle.

FIG. 6 is a top view and front view of a driver exterior rear view mirror assembly 1 in an assembled state. The assembly 1 is configured for a right exterior rear mirror for a right hand drive road vehicle. In other words, it is a right hand driver (RHD) mirror.

In the top view, the motor adaptor 4 is depicted as hidden edges with dashed lines. Since the driver position is on the right hand side, the motor adaptor is also oriented to the right hand side such that an orientation angle α of the plane of the motor adaptor 4 in relation to the plane of the case bezel 3 is positive.

The case bezel 3 is formed to be adapted to the positive angle α. Therefore, the frame 23 of the case bezel 3 is sloped in a similar angle α in order to case a rear mirror glass oriented to the right hand side.

As can be seen in the front view, the second form-coding element 6 formed as a recess in the right hand drive configuration of the case bezel 3 is positioned exactly such that the first form-coding element 5 of the right hand drive configuration of the motor adaptor 4 engages with it in a mounted state.

Figure 7:
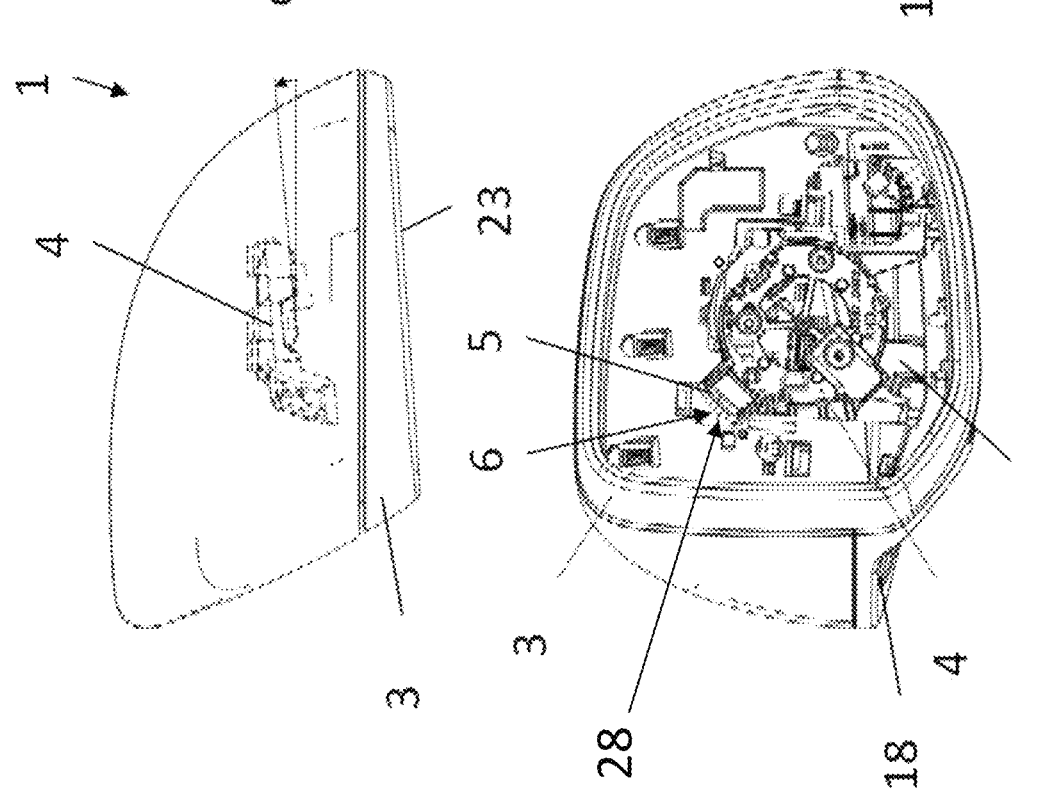
FIG. 7 is a top view and front view of a passenger exterior rear view mirror assembly in an assembled state for a left hand drive road vehicle.

FIG. 7 shows a top view and front view of a passenger exterior rear view mirror assembly in an assembled state for a left hand drive road vehicle. In other words, it is a right hand passenger (RHP) mirror.

Similar to FIG. 6, a right exterior rear mirror is shown. As can be seen in the top view, the motor adaptor 4' depicted as hidden edges with dashed lines has a different configuration and is now oriented to the left hand side such that an orientation angle β of the plane of the motor adaptor 4' in relation to the plane of the case bezel 3' is negative.

Similarly, also the case bezel 3' in the left hand drive configuration is formed differently in that it is adapted to the negative angle β. Therefore, the frame 23' is sloped in a similar negative angle β in order to case a rear mirror glass oriented to the left hand side.

As can be seen in the front view, the second form-coding element 6' formed as a recess in the left hand drive configuration of the case bezel 3' is positioned exactly such that the first form-coding element 5' of the left hand drive configuration of the motor adaptor 4' engages with it in a mounted state.

There is only a small clearance between the first and second form-coding elements, for example <1 mm. The configurations of FIG. 6 do not fit with the configurations of FIG. 7. Although both mirrors are configured for the right handside of a vehicle, the first form-coding element 5 of the right hand drive driver configuration of FIG. 6 (which in other words is a right hand driver, RHD configuration) is different from the first form-coding element 5' of the right hand drive passenger (which in other words is a right hand passenger, RHP) configuration, since the respective ramps 8 are positioned at slightly different locations at the circumferences of the motor adaptors 4, 4'. Furthermore, the second form-coding element 6 of the right hand drive driver configuration of the case bezel 3 is different from the second form-coding element 6' in the right hand drive passenger configuration of the case bezel 3', since the respective recesses are also positioned slightly different.

Mirrors for right hand drive and left hand passenger vehicles are symmetrically opposite to mirrors for left hand drive and right hand passenger vehicles. Therefore, the same principle applies to first and second form-coding elements of mirrors configured for the left hand side of a vehicle left, namely left hand drive driver and left hand drive passenger configurations.

In other words, right hand driver (RHD)/left hand passenger (LHP) mirrors are symmetrically opposite to left hand driver (LHD)/right hand passenger (RHP) mirrors and therefore the FIGS. 6 and 7 cover all hands of mirror for the purpose of the embodiment shown.

In this way, an exterior rear view mirror assembly system for left hand drive and right hand drive road vehicles is realized. The system comprises a rear mirror assembly 1 according to FIG. 1, wherein the frame structure 2 is configured to be attached equally to a vehicle body of a left hand drive and a right hand drive road vehicle, respectively. Accordingly, with respect to FIGS. 6 and 7 the same frame structure 2 with similar attachment section 18 is used.

However, the case bezel 3; 3' has a different configuration for a left hand drive and a right hand drive road vehicle, respectively, and the second form-coding element 6; 6' is form-coded in a first configuration for a left hand drive vehicle, as shown in FIG. 7, or in a second configuration for a right hand drive vehicle, as shown in FIG. 6. As a result, the motor adaptor 4; 4' and the case bezel 3; 3' can be attached to the frame structure 2 only if the respective first form-coding element 5; 5' corresponds to the respective configuration of the case bezel 3; 3' such that the first and second form-coding elements 5, 6; 5', 6' engage with each other.

In the embodiment of FIGS. 6 and 7, the motor adaptor 4; 4' has a different configuration for a left hand drive and a right hand drive road vehicle, respectively. The first form-coding element 5; 5' is form-coded in a first configuration for a left hand drive vehicle and in a second configuration for a right hand drive vehicle, respectively. Only the first configurations of the first and second form-coding elements 5, 6 or the second configurations of the first and second form-coding elements 5', 6' correspond to each other. In other words, the mounting of the case bezel 3; 3' and the motor adaptor 4, 4' is impossible if the configurations are mixed.

Although FIGS. 6 and 7 show different configurations of a right mirror assembly, the same applies in a similar manner to a left mirror assembly, of course.

The same applies to manufacturing of such an exterior rear view mirror assembly 1 for left hand drive and right hand drive road vehicles, respectively. The manufacturing comprises a step of providing a frame structure 2 configured to be equally attached to a vehicle body of a left hand drive and a right hand drive road vehicle, respectively.

Another step is providing a motor adaptor 4 configured to couple the frame structure with a mirror actuator, wherein the motor adaptor 4 comprises a first form-coding element 5. An additional step is providing a case bezel 3; 3' for casing a rear mirror glass and configured to be attached to the frame structure 2, wherein the case bezel 3; 3' has a different configuration for a left hand drive and a right hand drive road vehicle, respectively, and comprises a second form-coding element 6; 6' which is form-coded in a first configuration for a left hand drive vehicle or in a second configuration for a right hand drive vehicle. Finally, the method comprises a step of attaching the case bezel 3; 3' and the motor adaptor 4 to the frame structure 2 such that the first form-coding element 5 corresponds to the respective configuration of the case bezel 3; 3' and engages with the second form-coding element 6; 6'.

In the embodiment shown in FIGS. 6 and 7, the corresponding configurations of the case bezel 3; 3' and the motor adaptor 4; 4' are attached to the frame structure 2 in such a way that the first form-coding element 5; 5' engages with the second form-coding element 6; 6'. Furthermore, according to this embodiment, the motor adaptor 4; 4' is attached to the frame structure 2 before the case bezel 3; 3' is attached to the frame structure 2. Thus, subsequently attaching the case bezel 3; 3' to the frame structure 2 engages the first and second form-coding elements 5, 6; 5', 6' with each other such that the case bezel 3; 3' surrounds the motor adaptor 4; 4'. In particular, there is no overlap between the case bezel 3; 3' and the motor adaptor 4; 4' if the corresponding configurations are combined. However, if different configurations are mixed, the parts will overlap and in particular a collision between the first and second form coding elements 5, 6'; 5', 6 of the different configurations occurs. Accordingly, it would not be possible to attach the case bezel 3, 3' if the configurations were mixed.

Figure 8:
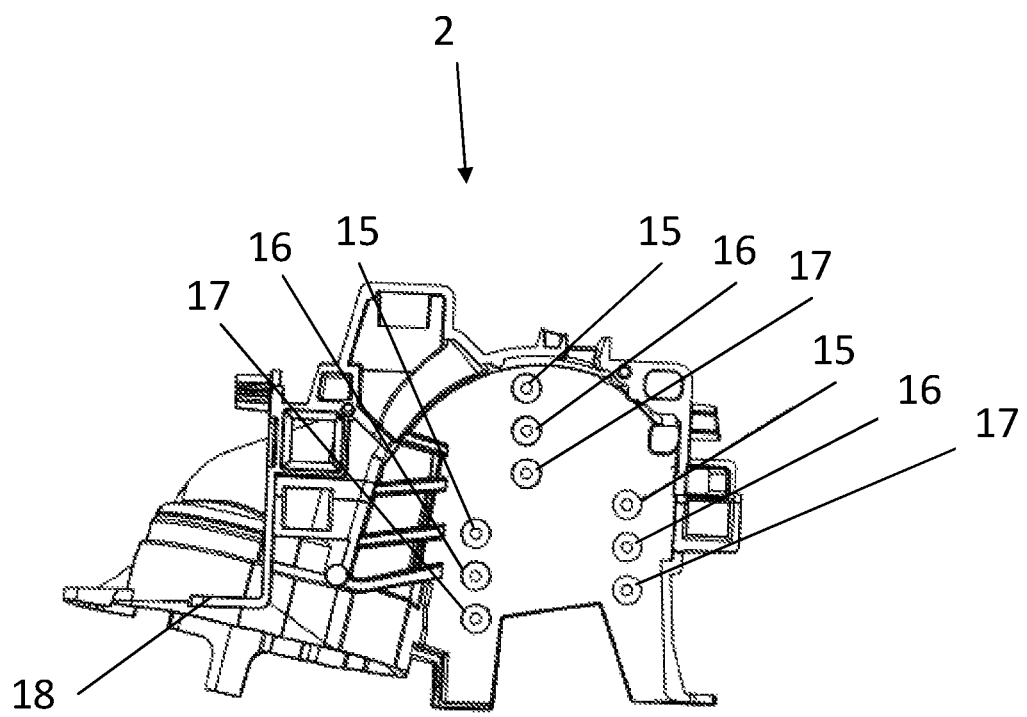
FIG. 8 is a detailed front view of a frame structure according to another embodiment.

Referring now to FIG. 8, a front view of a frame structure 2 according to another embodiment is schematically illustrated.

This embodiment differs from the embodiment of FIG. 2 in that the frame structure 2 comprises multiple sets of attachment points 15, 16, 17 for the motor adaptor 4 arranged in different heights. Accordingly, a position of the motor adaptor can be adjusted depending on the form and size of the case bezel 3 and the mirror glass.

Usually, it is desired to position the mirror actuator 27 (see FIGS. 13 and 14) in the centre of the mirror glass in order to reduce vibration of the mirror glass. With the multiple sets of attachment points 15, 16, 17, positioning of the motor adaptor 4 and therefore also of the mirror actuator in the centre of the mirror glass is possible for various forms and sizes of the case bezel 3 and mirror glass.

Figure 9A:
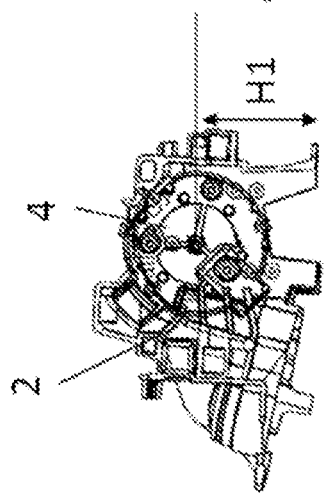
FIG. 9A-9C is a front view of a frame structure according to FIG. 8 and a motor adaptor mounted thereto in different heights.
Figure 9B:
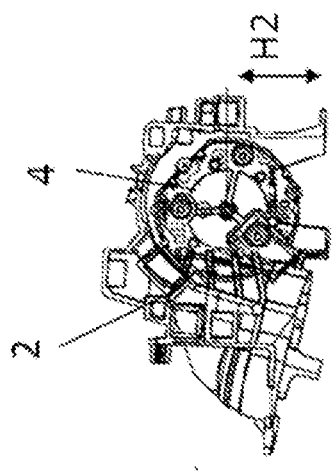
Figure 9C:
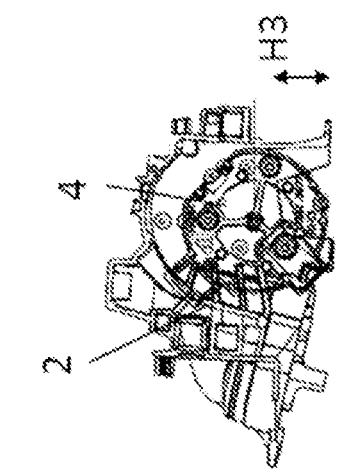

Referring now to FIGS. 9A-9C, a front view of a frame structure 2 according to FIG. 8 with a motor adaptor 4 mounted thereto in different heights is shown.

FIG. 9A shows the motor adaptor 4 attached to the frame structure 2 at the highest set of attachment points 15 in a first height H1, which is a highest height in this embodiment.

FIG. 9B shows the motor adaptor 4 attached to the frame structure 2 at the middle set of attachment points 16 in a second height H2, which is a middle height.

FIG. 9C shows the motor adaptor 4 attached to the frame structure 2 at the lowest set of attachment points 17 in a third height H3, which is a lowest height.

The different heights H1, H2 and H3 are configured for different sizes of the case bezel 3 and corresponding mirror glass in order to position the motor adaptor 4 such that the mirror actuator is arranged in the centre of the respectively sized mirror glass.

Figure 10A:
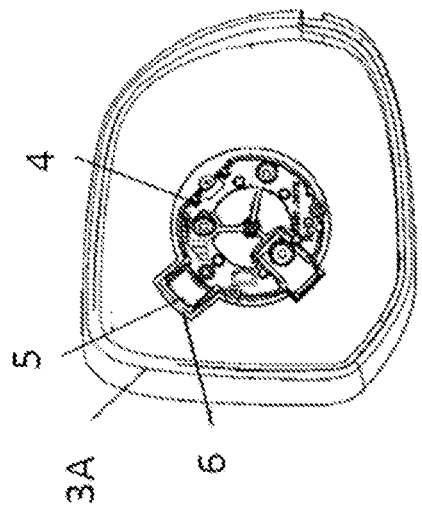
FIG. 10A-10C is a front view of an exterior rear view mirror assembly in an assembled state with differently sized case bezels corresponding to the different heights according to FIG. 9A-9C.
Figure 10B:
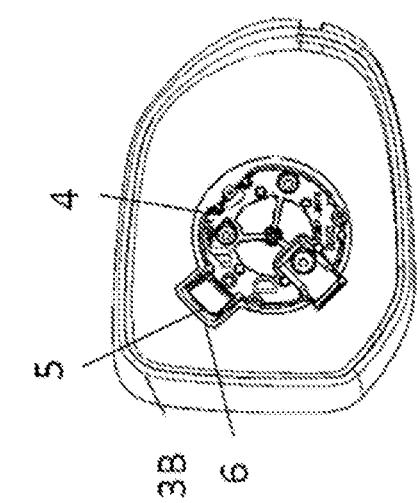
Figure 10C:
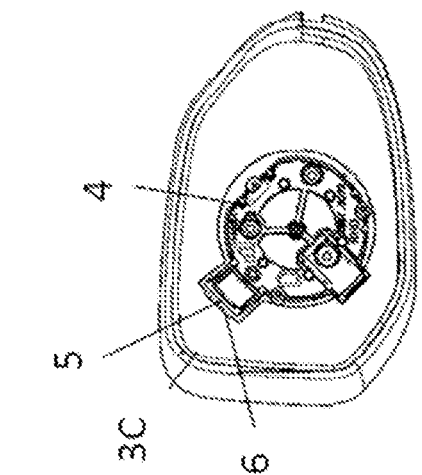

FIGS. 10A-10C show a front view of an exterior rear view mirror assembly 1 in an assembled state with differently sized case bezels 3A, 3B, 3C corresponding to the different heights H1, H2 and H3 according to FIGS. 9A-C.

The assembly of FIG. 10A has a large-sized case bezel 3A. Accordingly, the motor adaptor 4 is positioned at the highest height H1 according to FIG. 9A.

The assembly of FIG. 10B has a medium-sized case bezel 3B. Accordingly, the motor adaptor 4 is positioned at the medium height H2 according to FIG. 9B.

The assembly of FIG. 10C has a small-sized case bezel 3C. Accordingly, the motor adaptor 4 is positioned at the lowest height H3 according to FIG. 9C.

Similar to the preceding embodiments, the motor adaptor 4 comprises a first form coding element 5. All sizes of the case bezel 3A, 3B, 3C comprise a second form coding element 6 positioned corresponding to the respective predetermined mounting height H1, H2, H3 of the adaptor 4, such that the first and second form coding elements 5, 6 engage with each other if the motor adaptor 4 is mounted in the height corresponding to the respective size.

Figure 11:
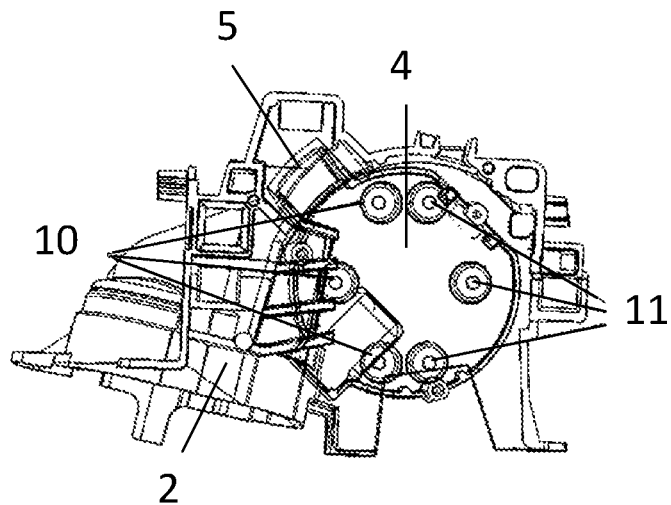
FIG. 11 is a detailed front view of a frame structure according to yet another embodiment and a motor adaptor according to another embodiment mounted thereto.

FIG. 11 shows a detailed front view of a frame structure 2 according to yet another embodiment and a motor adaptor 4 according to another embodiment mounted thereto.

This embodiment differs particularly from the embodiment of FIGS. 6 and 7 in that one motor adaptor 4 can be used equally for a left hand drive and a right hand drive road vehicle, respectively. Therefore, the motor adaptor 4 is configured to be mounted to the frame structure 2 in two different orientations. In this way, the number of different parts necessary for an assembly system 1 is reduced for example from four variants (left mirror driver, left mirror passenger, right mirror driver, right mirror passenger) to only two variants (left mirror, right mirror) that can be assembled according to the required driver or passenger orientation.

Therefore, the motor adaptor 4 comprises a first set of attachment elements 10 and a second set of attachment elements 11, which are used depending on the desired orientation of the mirror actuator and the configuration of the case bezel 3. The frame structure 2 also comprises different sets of corresponding attachment points 12, 13 (see FIGS. 13, 14) for the first and second sets of attachment elements 10, 11.

Figure 12:
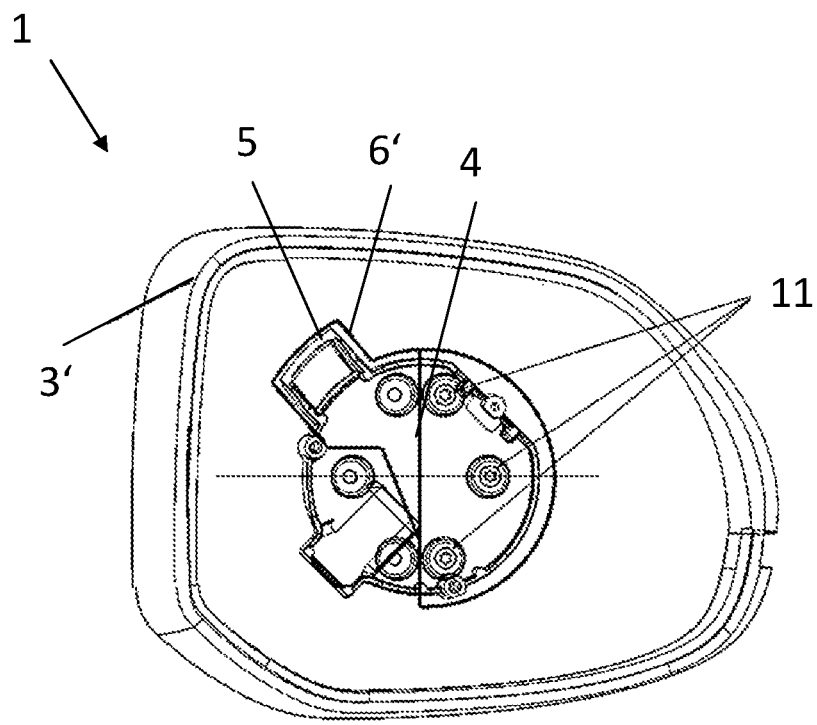
FIG. 12 is a front view of an exterior rear view mirror assembly in an assembled state according to an embodiment.

FIG. 12 is a front view of an exterior rear view mirror assembly 1 in an assembled state according to an embodiment.

The embodiment shown is a right hand drive configuration of a right rear mirror assembly 1. In order to orient the motor adaptor 4 to the right hand side, the second set of attachment elements 11 is attached to the frame structure 2. In this way, it is achieved that the orientation corresponds to the right hand drive configuration of the case bezel 3' and the first form-coding element 5 engages with the second form-coding element 6'.

In a similar way, the motor adaptor 4 is attachable in a left hand drive configuration to the frame structure 2 with the first set of attachment elements 10 in order to orient the motor adaptor 4 to the left hand side. In this way, the orientation corresponds to the left hand drive configuration of the case bezel 3 and the first form-coding element 5 engages with the second form-coding element 6.

For manufacturing, the motor adaptor 4 is attached to the frame structure 2 either with the first set of attachment elements 10 in a first position relative to the frame structure 2 such that the first form-coding element 5 corresponds to the first configuration of the second form-coding element 6 for a left hand drive vehicle.

Alternatively, the motor adaptor 4 is attached to the frame structure 2 with the second set of attachment elements 11 in a second position relative to the frame structure 2 such that the first form-coding element 5 corresponds to the second configuration of the second form-coding element 6' for a right hand drive vehicle.

Figure 13:
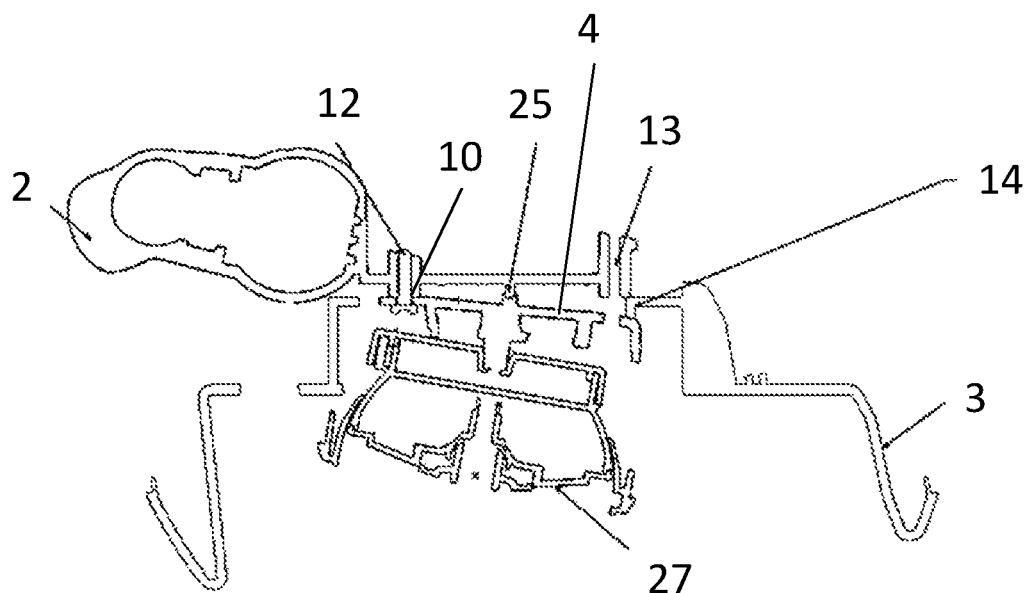
FIG. 13 is a sectional view in a horizontal plane of a passenger exterior rear view mirror assembly in an assembled state for a left hand drive road vehicle.

FIG. 13 is a sectional view in a horizontal plane of a passenger exterior rear view mirror assembly in an assembled state for a right rear mirror of a left hand drive road vehicle.

This embodiment is based on the previous embodiment of FIGS. 11 and 12 and additionally uses the case bezel 3 to structurally support the motor adaptor 4. Therefore, the motor adaptor 4 is partially attached to the case bezel 3.

Accordingly, a different assembly sequence is required compared to the embodiment of FIGS. 6, 7. The case bezel 3, 3' is therefore attached to the frame structure 2 before the motor adaptor 4. Subsequently, the motor adaptor 4 is attached to the frame structure 2 such that it overlaps at least partially the case bezel 3 and is structurally supported by the case bezel 3.

As can be seen in FIG. 13, fasteners such as screws can be used to mount the first set of attachment elements 10 of the motor adaptor 4 to the first set of attachment point 12 of the frame structure 2. In this way, the left side of the motor adaptor 4 is fixed to the frame structure 2. A central part of the motor adaptor is supported by a pivot spine 25 of the frame structure. The right side of the motor adaptor 4 is attached to a supporting section 14 of the left hand drive configuration of the case bezel 3. In this way, an angle of the motor adaptor is created that puts the mirror actuator 27 into a positon oriented to the left. Accordingly, a similar negative orientation angle β as schematically shown in FIG. 7 is achieved.

Figure 14:
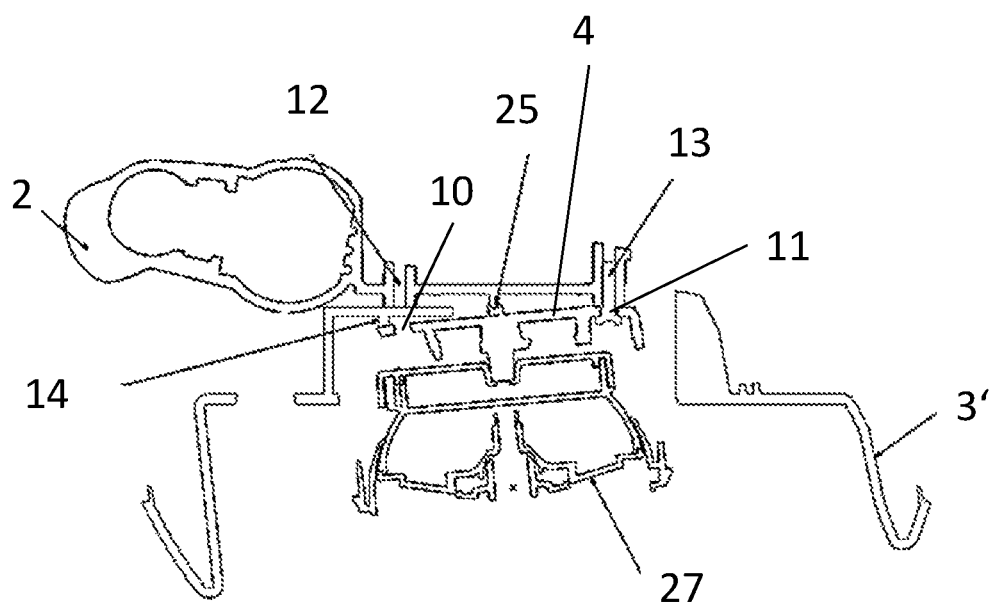
FIG. 14 is a sectional view in a horizontal plane of a driver exterior rear view mirror assembly in an assembled state for a right hand drive road vehicle.

FIG. 14 is a sectional view in a horizontal plane of a driver exterior rear view mirror assembly for a right hand drive road vehicle.

In FIG. 14, the same principle is applied to the other side, such that the right side of the motor adaptor 4 is fixed to the frame structure 2 by means of the second attachment elements 11 mounted to the second attachment points 13 of the frame structure 2. The left side of the motor adaptor 4 is attached to a supporting section 14 of the right hand drive configuration of the case bezel 3'.

In this way, the motor adaptor 4 is pivoted to the right around the pivot spine 25 such that an angle of the motor adaptor 4 is created that puts the mirror actuator 27 into a positon oriented to the right. Accordingly, a similar positive orientation angle α as schematically shown in FIG. 6 is achieved.

Although specific embodiments of the invention are illustrated and described herein, it will be appreciated by those of ordinary skill in the art that a variety of alternative and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

LIST OF REFERENCE SIGNS 1 assembly
2 frame structure
3; 3' case bezel
3A large sized case bezel
3B medium sized case bezel
3C small sized case bezel
4; 4' motor adaptor
5, 5' first form-coding element
6; 6' second form-coding element
7 sliding element
8 ramp
9 recess
10 first set of attachment elements
11 second set of attachment elements
12 first set of attachment points
13 second set of attachment points
14 supporting section
15 set of attachment points
16 set of attachment points
17 set of attachment points
18 attachment section
19 attachment points
20 attachment points
21 attachment elements
22 attachment elements
23, 23' frame
24 aperture
25 pivot spine
26 attachment points 27 mirror actuator
28 mirror vibration damper
H1-H3 height
α positive orientation angle
β negative orientation angle

What we claim is:

1. An exterior rear view mirror assembly for road vehicles, the exterior rear view mirror assembly comprising:
a frame structure configured to be attached to a vehicle body;
a case bezel for casing a rear mirror reflective element and configured to be attached to the frame structure; and
a motor adaptor configured to couple the frame structure with a mirror actuator,
wherein the motor adaptor comprises a first set of attachment elements and a second set of attachment elements, wherein the frame structure comprises corresponding attachment points for both of the first and second sets of attachment elements,
wherein the motor adaptor comprises a first form-coding element different from the first and second sets of attachment elements and the case bezel comprises a second form-coding element,
wherein the first and second form-coding elements are formed and arranged such that they correspond to and engage with each other when the case bezel and the motor adaptor are attached to the frame structure without attaching the motor adapter by the first and second sets of attachment elements and such that the case bezel and the motor adaptor cannot be assembled if the first and second form-coding elements do not correspond,
wherein the first form-coding element is formed integral with a sliding element configured to contact a mirror vibration damper on the case bezel,
wherein the first form-coding element is formed as a ramp extending from the motor adaptor.

2. The exterior rear view mirror assembly of claim 1, wherein the ramp is formed cored-out such that it comprises a recess.

3. The exterior rear view mirror assembly of claim 1, wherein the second form-coding element is a recess in the case bezel which is formed to accommodate a section of the ramp.

4. An exterior rear view mirror assembly system for left hand drive and right hand drive road vehicles,
the exterior rear view mirror assembly system comprising a rear mirror assembly, the rear mirror assembly comprising a frame structure configured to be attached to a vehicle body; a case bezel for casing a rear mirror reflective element and configured to be attached to the frame structure; and a motor adaptor configured to couple the frame structure with a mirror actuator, wherein the motor adaptor comprises a first set of attachment elements and a second set of attachment elements, wherein the frame structure comprises corresponding attachment points for both of the first and second sets of attachment elements, wherein the motor adaptor comprises a first form-coding element and the case bezel comprises a second form-coding element, wherein the first and second form-coding elements are formed and arranged such that they correspond to and engage with each other when the case bezel and the motor adaptor are attached to the frame structure without attaching the motor adapter by the first and second sets of attachment elements and such that the case bezel and the motor adaptor cannot be assembled if the first and second form-coding elements do not correspond,
wherein the frame structure is configured to be attached equally to a vehicle body of a left hand drive and a right hand drive road vehicle, respectively;
wherein the case bezel has a different configuration for a left hand drive and a right hand drive road vehicle, respectively, and the second form-coding element is form-coded in a first configuration for a left hand drive vehicle or in a second configuration for a right hand drive vehicle,
wherein the motor adaptor is configured equally for a left hand drive and a right hand drive road vehicle, respectively,
wherein the motor adaptor is attachable to the frame structure with the first set of attachment elements such that the first form-coding element corresponds to the first configuration of the second form-coding element,
and wherein the motor adaptor is attachable to the frame structure with the second set of attachment elements such that the first form-coding element corresponds to the second configuration of the second form-coding element,
wherein the motor adaptor and the case bezel can be attached to the frame structure only if the first form-coding element corresponds to the respective configuration of the case bezel such that the first and second form-coding elements engage with each other.

5. The assembly system of claim 4, wherein the motor adaptor has a different configuration for a left hand drive and a right hand drive road vehicle, respectively, wherein the first form-coding element is form-coded in a first configuration for a left hand drive vehicle or in a second configuration for a right hand drive vehicle, wherein the first configurations of the first and second form-coding elements correspond to each other and the second configurations of the first and second form-coding elements correspond to each other.

6. The assembly system of claim 4, wherein the motor adaptor is attached to the frame structure with the first set of attachment elements in a first position relative to the frame structure for a left hand drive vehicle and with the second set of attachment elements in a second position relative to the frame structure for a right hand drive vehicle.

7. The assembly system of claim 6, wherein the motor adaptor is partially attached to and structurally supported by the case bezel in at least one of the first and second positions.

8. The assembly system of claim 4, further configured for different sizes of the case bezel, wherein the frame structure comprises at least two sets of attachment points arranged in different heights, such that the motor adaptor is attachable in a first height in the centre of a case bezel of a first size and in a second height in the centre of a case bezel of a second size.

9. A method of manufacturing an exterior rear view mirror assembly for left hand drive and right hand drive road vehicles, the manufacturing method comprising:
providing a frame structure configured to be equally attached to a vehicle body of a left hand drive and a right hand drive road vehicle, respectively;
providing a motor adaptor configured to couple the frame structure with a mirror actuator, wherein the motor adaptor comprises a first set of attachment elements, a second set of attachment elements and a first form-coding element different from the first and second sets of attachment elements, wherein the frame structure comprises corresponding attachment points for both of the first and second sets of attachment elements, providing a case bezel for casing a rear mirror glass and configured to be attached to the frame structure, wherein the case bezel has a different configuration for a left hand drive and a right hand drive road vehicle, respectively, and comprises a second form-coding element which is form-coded in a first configuration for a left hand drive vehicle or in a second configuration for a right hand drive vehicle; and attaching the case bezel and the motor adaptor to the frame structure such that the first form-coding element corresponds to the respective configuration of the case bezel and engages with the second form-coding element.

10. The method of claim 9, wherein the motor adaptor also has a different configuration for a left hand drive and a right hand drive road vehicle, respectively, wherein the first form-coding element is form-coded in a first configuration for a left hand drive vehicle or in a second configuration for a right hand drive vehicle, wherein the first configurations of the first and second form-coding elements correspond to each other and the second configurations of the first and second form-coding elements correspond to each other, wherein the corresponding configurations of case bezel and the motor adaptor are attached to the frame structure such that the first form-coding element engages with the second form-coding element.

11. The method of claim 9, wherein the motor adaptor is attached to the frame structure before the case bezel is attached to the frame structure, wherein attaching the case bezel to the frame structure engages the first and second form-coding elements with each other such that the case bezel surrounds the motor adaptor.

12. The method of claim 9, wherein the motor adaptor is attached to the frame structure with the first set of attachment elements in a first position relative to the frame structure such that the first form-coding element corresponds to the first configuration of the second form-coding element for a left hand drive vehicle, or the motor adaptor is attached to the frame structure with the second set of attachment elements in a second position relative to the frame structure such that the first form-coding element corresponds to the second configuration of the second form-coding element for a right hand drive vehicle.

13. The method of claim 12, wherein the case bezel is attached to the frame structure before the motor adaptor, wherein the motor adaptor is attached to the frame structure such that it overlaps at least partially the case bezel and is structurally supported by the case bezel.

* * * * *